United States Patent
Heijkens

(10) Patent No.: US 12,214,280 B2
(45) Date of Patent: Feb. 4, 2025

(54) CONTROLLING A USER INTERFACE

(71) Applicant: KING.COM LIMITED, St. Julians (MT)

(72) Inventor: Mick Heijkens, Barcelona (ES)

(73) Assignee: KING.COM LIMITED, St. Julians (MT)

( * ) Notice: Subject to any disclaimer, the term of this patent is extended or adjusted under 35 U.S.C. 154(b) by 0 days.

(21) Appl. No.: 18/530,603

(22) Filed: Dec. 6, 2023

(65) Prior Publication Data

US 2024/0100430 A1 Mar. 28, 2024

Related U.S. Application Data

(63) Continuation of application No. 17/452,134, filed on Oct. 25, 2021, now Pat. No. 11,872,489.

(51) Int. Cl.
*A63F 13/537* (2014.01)
*G06F 3/0488* (2022.01)

(52) U.S. Cl.
CPC .......... *A63F 13/537* (2014.09); *G06F 3/0488* (2013.01)

(58) Field of Classification Search
CPC ............................. A63F 13/537; G06F 3/0488
See application file for complete search history.

(56) References Cited

U.S. PATENT DOCUMENTS

| | | | | |
|---|---|---|---|---|
| 2014/0128159 A1* | 5/2014 | Knutsson | ................ | A63F 13/35 463/31 |
| 2014/0342791 A1* | 11/2014 | Hugh | ...................... | A63F 13/80 463/9 |
| 2014/0370950 A1* | 12/2014 | Hansson | ................ | A63F 13/00 463/9 |

OTHER PUBLICATIONS

TB, "How to Play Candy Crush Saga", published: Oct. 10, 2019, techboomers.com, https://techboomers.com/t/how-to-play-candy-crush-saga (Year: 2019).*
Fandom, "How to Play—Bejeweled Wiki", confirmed published: May 5, 2019, fandom.com, https://bejeweled.fandom.com/wiki/How_to_Play, How to Play | Bejeweled Wiki | FANDOM powered by Wikia (archive.org) (Year: 2019).*
Candy Crush Saga Wiki (CC-Wiki) ("Hard levels", https://candycrush.fandom.com/wiki/Hard_levels#:~:text=In%20the%20early%20days%20of,in%20the%202000s%20and%203000's., https://web.archive.org/web/20201113082738/https://candycrush.fandom.com/wiki/Hard_levels).

(Continued)

*Primary Examiner* — Seth A Silverman
(74) *Attorney, Agent, or Firm* — Holzer Patel Drennan

(57) ABSTRACT

A set of levels of a game is displayed and a user selection of one of the levels detected. It is determined that the user is partaking in a fragment collection event, the fragment collection event defining a set of collection conditions, and that one of the collection conditions is satisfied. Fragments are assigned to the user, the fragments having no utility within a game environment, wherein only one collection condition can be satisfied per level selection. A fragment count is stored, where assigning the one or more fragments to the user comprises incrementing the fragment count associated with the user by a predefined amount associated with the satisfied collection condition. When the fragment count is equal to or greater than a threshold fragment count, the fragment count is decreased by an amount equal to the threshold fragment count and a utility object assigned to the user.

14 Claims, 11 Drawing Sheets

(56) References Cited

OTHER PUBLICATIONS

Candy Crush Saga Wiki (CC-Wiki2), ("Level", https://candycrush.fandom.com/wiki/Level, available: Jun. 28, 2019, https://web.archive.org/web/20190628202316/https://candycrush.fandom.com/wiki/Level).

Fandom, "How to Play—Bejeweled Wiki," https://bejeweled.fandom.com/wiki/How_to_Play, How to Play | Bejeweled Wiki | FANDOM powered by Wiki (archive.org), 2019.

Fandom2 "Bejeweled Multiplayer—Bejeweled Wiki," https://bejeweled.fandom.com/wiki/Bejeweled_Multiplayer, 2019.

TB, "How to Play Candy Crush Saga," https://techboomers.com/t/how-to-play-candy-crush-saga, 2019.

* cited by examiner

| Player ID | Fragment Count |
|---|---|
| 0501 | 2 |
| 1964 | 0 |
| 3597 | 5 |
| 6610 | 9 |

Figure 5

| Condition 1 | Condition 2 | Fragment Amount | Threshold Amount |
| --- | --- | --- | --- |
| Level 1-1000 | Streak between 1 and 5 | 1 | 20 |
| Level 1-1000 | Streak between 6 and 10 | 2 | 20 |
| Level 1-1000 | Streak greater than 10 | 3 | 20 |
| Level 1001-2000 | Streak between 1 and 5 | 2 | 15 |
| Level 1001-2000 | Streak between 6 and 10 | 3 | 15 |
| Level 1001-2000 | Streak greater than 10 | 4 | 15 |

Figure 6

| Player ID | Current Level | Current Streak | Gold Bars |
|---|---|---|---|
| 3597 | 1072 | 4 | 7 |

Figure 7

CONTROLLING A USER INTERFACE

CROSS-REFERENCE TO RELATED APPLICATIONS

This is a continuation of U.S. application Ser. No. 17/452,134, filed on Oct. 25, 2021, the entire contents of which being fully incorporated herein by reference.

TECHNICAL FIELD OF INVENTION

The present disclosure relates to controlling a user interface responsive to user engagement with displayed elements on the interface of a computer device.

BACKGROUND OF THE INVENTION

There are multiple technical challenges facing the designer of computer-implemented games to create a fun and compelling game. One particular challenge is that of engagement.

Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment.

One technical area where there are particular challenges in controlling the display of a computer device is in the design of computer-implemented games. Not only is there a requirement to create fun and compelling games, these games need to be delivered to a player in a seamless and engaging fashion, while adhering to complex game rules.

Games have been developed in which a user engages game elements in a board to achieve certain objectives, by causing game elements to be removed in a strategic fashion.

A 'clicker game' is a type of casual puzzle game where the player is required to find patterns on a seemingly chaotic board. The player then has to match two or more of the same type of game element on the game board and those matched elements will then be removed from the board. The player matches adjacent game elements of the same type by selecting one or more of the game elements in the group of matching elements.

A 'switcher game' is also a type of casual puzzle game where the player is required to find patterns on a seemingly chaotic board. In a switcher game, the player switches the locations of two adjacent game elements on the game board so that one or both of them create a chain of at least three adjacent game elements of the same type. Those matched game elements will then disappear. The game board is then repopulated with game objects.

Another known type of game is a "linker game", where a sequence of game elements are linked to form a known sequence, such as a word, which can be matched to a dictionary. When a known sequence is linked, game elements in the link are removed from the gameboard.

Another known type of game is a "shooter game". In such a game, a player deposits, or "shoots", a game object at a set of game objects already on a gameboard. If the shot game element hits one or more matching game object on the board, all matching elements connected to the hit element are removed from the gameboard.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

In order to increase involvement in such games, the present inventors have devised a fragmental reward system, in which a player, when playing in a collection event, is rewarded with fragments of a utility game object. Once the player has collected enough fragments, the fragments are exchanged for the utility object. The fragments themselves have no utility in the game, while the utility objects do. The player is rewarded fragments if they satisfy a collection condition. The condition may be, for example, a required winning streak across multiple game levels of a game. The user is, thus, incentivised to continue playing levels of the game in order to collect enough fragments to exchange for utility objects, which can further benefit the player in the game.

According to a first aspect of the present invention, there is provided a method of controlling a graphical user interface of a computer device, the method comprising: displaying on the graphical user interface a set of levels of a game, the game being executed by one or more processor; detecting a user selection of one of the set of levels at the graphical user interface; determining by the one or more processor that the user is partaking in a fragment collection event, the fragment collection event defining a set of collection conditions; determining by the one or more processor that one of the collection conditions is satisfied and assigning one or more fragments to the user, the fragments having no utility within a game environment comprising the game, wherein only one collection condition can be satisfied per level selection; storing in computer memory a fragment count associated with the user; where assigning the one or more fragments to the user comprises incrementing the fragment count associated with the user by a predefined amount associated with the satisfied collection condition, the fragment count defining a number of fragments collected by the user; determining that the fragment count is equal to or greater than a threshold fragment count associated with a utility object, the utility object having a utility within the game environment comprising the game; decreasing the fragment count by an amount equal to the threshold fragment count; and assigning the utility object to the user by storing the utility object in computer memory in association with the user.

In some embodiments, the method may comprise rendering an inactivatable visual indication of the fragment count on the graphical user interface.

In some embodiments, assigning the utility object to the user may comprise rendering a visual indication of the utility object on the graphical user interface.

In some embodiments, the visual indication may be selectable by the user to activate the utility object.

In some embodiments, the collection condition may define a number of levels for the user to complete consecutively.

In some embodiments, the predefined amount may be based on the number of levels consecutively completed by the user.

In some embodiments, the collection condition may define a number of levels for the user to win consecutively, wherein the user competes against at least one other user in the level, wherein the user wins a level if completed with at least one of a higher score or a shorter completion time than the at least one other user with whom the player is competing.

In some embodiments, the predefined amount may be based on the number of levels consecutively won by the user.

In some embodiments, the predefined amount may be based on the user selected level.

In some embodiments, the threshold fragment count may be based on the user selected level.

In some embodiments, the method may further comprise assigning an additional one or more utility objects together with the utility object, the additional one or more utility objects being based on the user selected level.

In some embodiments, the method may further comprise: detecting that the user has exited the fragment collection event; and resetting to zero the fragment count associated with the user.

In some embodiments, the collection event may be associated with a predefined time period.

In some embodiments, the collection event may be associated with a predefined time period, wherein the step of detecting that the user has exited the fragment collection event comprises determining if the predefined time period has expired.

In some embodiments, the method may comprise rendering on the graphical user interface a user selectable event element and detecting a user selection of the user selectable event element to initiate partaking in the fragment collection event.

In some embodiments, the fragment collection event may be associated with a predefined subset of the set of levels, wherein the user partakes in the fragment collection event when the user selects one of the predefines subset.

In some embodiments, the utility object may be a unit of soft currency exchangeable within the game environment for a game feature for aiding a user in gameplay.

In some embodiments, the method may further comprise storing, in a fragment database accessible by the processor of the computer device, the fragment count associated with the user.

In some embodiments, the method may further comprise: assigning one or more second fragments to the user, the second fragments having no utility within the game environment comprising the game; storing in computer memory a second fragment count associated with the user; where assigning the one or more second fragments to the user comprises incrementing the second fragment count associated with the user by a predefined amount associated with the satisfied collection condition, the second fragment count defining a number of second fragments collected by the user; determining that the second fragment count is equal to or greater than a threshold second fragment count associated with a second utility object, the second utility object having a utility within the game environment comprising the game and being different to the utility object; decreasing the second fragment count by an amount equal to the threshold second fragment count; and assigning the second utility object to the user by storing the second utility object in computer memory in association with the user.

In some embodiments, the method may further comprise: displaying on the graphical user interface a gameboard associated with the user selected one of the set of levels, the gameboard comprising tiles supporting game objects, the game objects comprising user activatable game elements of differing characteristics; detecting a user input at the user interface when a user engages with the user activatable game element in a game move; detecting a match condition of a plurality of user activatable game elements having matching characteristics; and removing the plurality of the game elements of the match game condition and generating and displaying new game objects to replenish the gameboard for a next game move.

In some embodiments, the utility object may be a special game object for use in gameplay, the special game object being provided on the gameboard of the selected level and actuatable in the match game condition to cause at least one additional game element to be removed from the gameboard.

In some embodiments, the one or more processor may be a one or more processor of the computer device.

In some embodiments, the one or more processor may be a one or more processor of a server computer device remote from the computer device.

According to a second aspect of the present invention, there is provided a computer device comprising: a graphical user interface; one or more processors configured to execute game code, which, when executed by the one or more processors, causes the one or more processors to: display on the graphical user interface a set of levels of a game; detect a user selection of one of the set of levels at the graphical user interface; determine that the user is partaking in a fragment collection event, the fragment collection event defining a set of collection conditions; determine that one of the collection conditions is satisfied and assigning one or more fragments to the user, the fragments having no utility within a game environment comprising the game, wherein only one collection condition can be satisfied per level selection; store in computer memory a fragment count associated with the user; where assigning the one or more fragments to the user comprises incrementing the fragment count associated with the user by a predefined amount associated with the satisfied collection condition, the fragment count defining a number of fragments collected by the user; determine that the fragment count is equal to or greater than a threshold fragment count associated with a utility object, the utility object having a utility within the game environment comprising the game; decrease the fragment count by an amount equal to the threshold fragment count; and assign the utility object to the user by storing the utility object in computer memory in association with the user.

According to a third aspect of the present invention, there is provided a non-transitory computer readable media on which is stored computer readable code which, when executed by one or more processor, causes the one or more processor to: display on a graphical user interface of a computer device a set of levels of a game; detect a user selection of one of the set of levels at the graphical user interface; determine that the user is partaking in a fragment collection event, the fragment collection event defining a set of collection conditions; determine that one of the collection conditions is satisfied and assigning one or more fragments to the user, the fragments having no utility within a game environment comprising the game, wherein only one collection condition can be satisfied per level selection; store in computer memory a fragment count associated with the user; where assigning the one or more fragments to the user comprises incrementing the fragment count associated with the user by a predefined amount associated with the satisfied collection condition, the fragment count defining a number of fragments collected by the user; determine that the fragment count is equal to or greater than a threshold fragment count associated with a utility object, the utility object having a utility within the game environment comprising the game; decrease the fragment count by an amount equal to the threshold fragment count; and assign the utility object to the user by storing the utility object in computer memory in association with the user.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 5 is an example fragment database;

FIG. 6 shows an example set of collection conditions for the collection event;

FIG. 7 shows an example player progression database;

DETAILED DESCRIPTION

Figure 1:
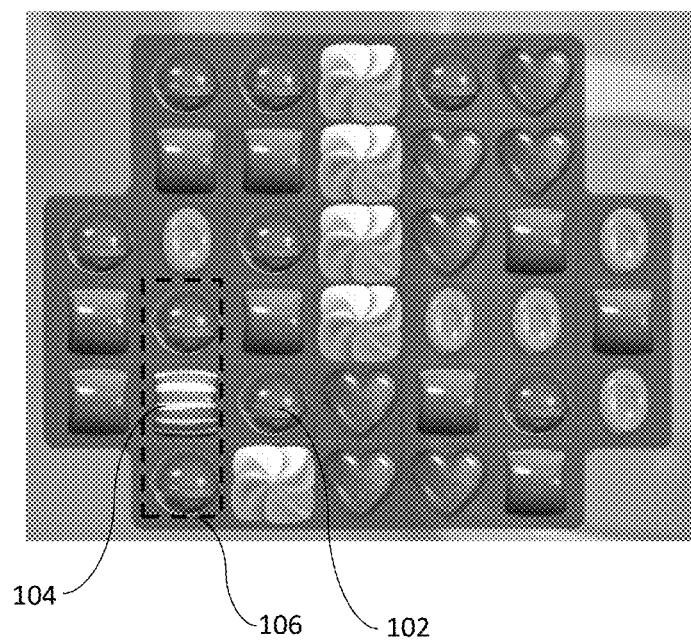
FIG. 1 shows an example gameboard.

The present disclosure describes a technique for allowing players to collect fragments of a utility game object during a gameplay event, the fragments being exchanged for the utility object once a sufficient amount of fragments has been collected. The player may collect different amounts of fragments based on different criteria, such as a level the player is playing or a "winning streak" of the player. The user may only collect such fragments when playing game levels within a "collection event" which is determined by a game provider.

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing form the scope of the present invention.

The techniques described herein can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another possible infrastructure is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

A user may download a game executable at the time that he logs on to the server, or at subsequent log-in occasions. He may download a game executable once, and then receive updates at subsequent log-ins. The executable will contain information for rendering a map for that user, and game logic for allowing the user to play the game on or off-line. Certain features of the game are available on or off line, while other features are available only when the user device is on line—i.e. in communication with the server.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

In implementations where some or all elements of gameplay are executed on a remote server, users may be able to share their gaming experiences with other users. They may, for example, be able to share their personal virtual environments which they generate through game play. Users may be able to choose which other users to share their environment with, for example their friends on a social media platform such as Facebook. This gives a social aspect to the game.

The following describes an implementation in which the game uses a "switcher" mechanic where two objects (referred to in this document as blocks or game elements) are selected by a player and their locations on the gameboard switched. To play the game, a player clicks on any two touching blocks on the gameboard, causing the blocks to switch location. If the blocks are subsequently in a group of three or more blocks meeting a match-3 condition, that is, there is a group of at least 3 adjacent blocks of the same colour, the blocks meeting the condition are removed from the gameboard. Once removed, any blocks above the cleared combination fall down to fill the gaps created by the removed blocks. A refill process fills the vacant tile locations of the gameboard which have been created due to block removal with new blocks. Candy Crush Saga™ is an action puzzle game created by King.com, in which a player can make their way through a variety of levels in this switcher style adventure.

FIG. 1 shows an example of a switcher game. Grid elements at location 106 are filled with two blue blocks and a green block 104. Adjacent to the green block 104 is another blue block 102. The user selects the blue block 102 and green block 104 in order to swap their locations on the gameboard, resulting in all blocks at grid location 106 being blue. Since there are now three adjacent blue blocks, the match-3 condition has been met and so the blocks at location 106 of the gameboard are removed.

In the above example, the colour of each block is a characteristics of the block. The match-3 condition requires that three blocks having a matching characteristic, here their colour, are located in adjacent tiles of the gameboard.

The following sections will refer to a game with a switcher mechanic. The ideas explained may also be implemented for games with other mechanics.

To exemplify the invention, one particular game will now be described. It will be evident that the features described herein may be applied in many different games.

The present disclosure relates to a feature within Candy Crush Saga™ referred to as Gold Rush, an event-based fragmented-reward collection mechanism. The user collects fragments of gold bars, the fragments are sometimes referred to herein as "nuggets". In one example, the user is awarded nuggets based on their winning streak, that is the number of levels they have consecutively completed without failing a level. Once the user has collected a sufficient number of nuggets, the nuggets are exchanged automatically for a gold bar. The nuggets themselves have no utility within the game or game environment. In some embodiments, fragments are exchangeable for other rewards, such as boosters, as described below.

The user is able to collect nuggets while participating in the collection event. The collection event is defined at the remote server, also referred to as the central game server. The collection event may be downloaded to the player's device when in communication with the game server while the collection event is active. The user my then participate in the collection event while playing offline. In some embodiments, the collection event is available to download prior to the start of the collection event, to ensure that the player can participate in the collection event for the full period of the event. Alternatively, the user may only be able to participate in the collection event when connected to the server, that is the collection event is not downloadable, such that the collection event is executed by a processor of the game server. The collection event defines one or more algorithms for implementing the method for collecting fragments and rewards as described below. The collection event also defines one or more conditions for collecting the fragments and rewards.

The "game environment" referred to herein encompasses the game and its levels as well as any pre-level user interfaces (for example FIGS. 2 and 3 described below) of level selection user interfaces. The game environment may provide the user with further game related features, such as a virtual shop for exchanging utility game objects.

Figure 2:
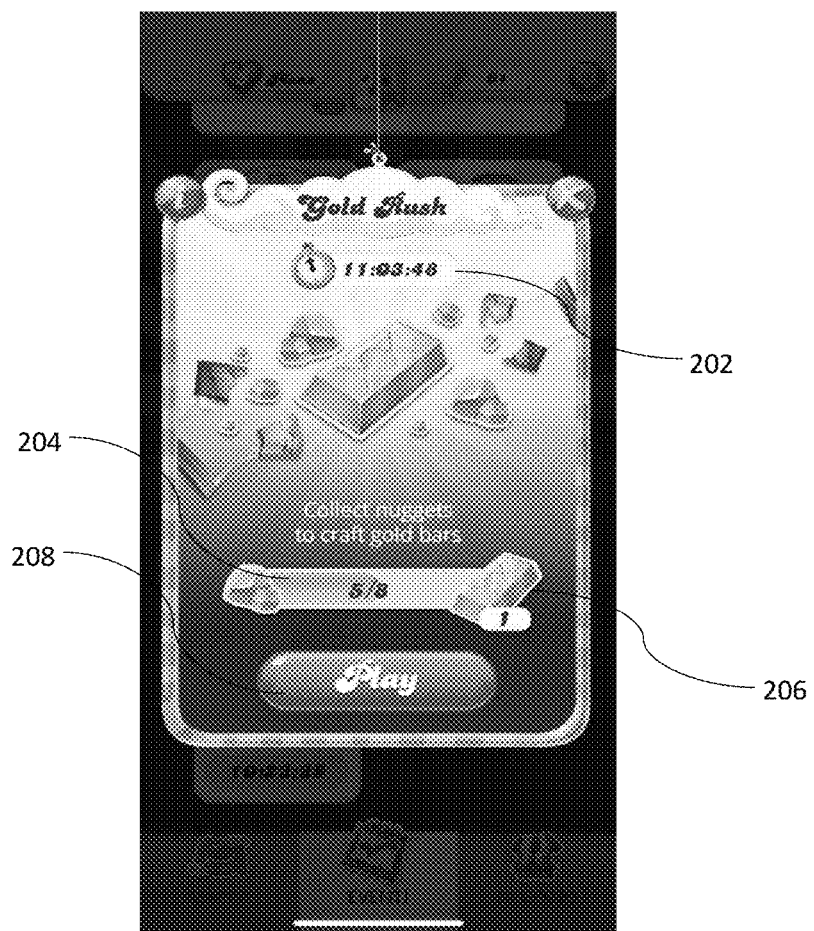
FIG. 2 is an example collection event information user interface.

FIG. 2 shows a collection event information user interface. In the present example, Gold Rush is implemented for a predefined time period associated with the event. For example, the event may run from 00:00 on Monday until 00:00 on Friday, i.e. from Monday to Thursday inclusive. In some embodiments, the user can only collect nuggets during this time period. At the end of the time period, any nuggets the user has collected which have not yet been exchanged for gold bars are lost.

The collection event user interface may be displayed to the user when the user selects an event information icon on a game level selection user interface. The collection event user interface comprises a clock 202, a progression indicator 204, a reward indicator 206, and an event activation element 208.

The clock 202 provides the user with a time remaining in the event.

The progression indicator 204 illustrates to the user how may nuggets the user has collected and how many are required to exchange for the reward. Here, the progression indicator 204 comprises a progression bar which is filled in proportion to the number of collected nuggets compared to the required number of nuggets. The progression indicator 204 also comprises a progression score which shows the progression in numbers. Here, the score is "5/8", showing that the user has collected 5 nuggets out of the 8 nuggets required to exchange for the gold bar.

The reward indicator 206 provides the user with information about the reward, or utility object, which will be provided to them in exchange for the required number of nuggets. Here, an image of a gold bar is rendered to the user with a value of 1 shown next to it, indicating that, on collecting 8 nuggets, the 8 nuggets will be exchanged for 1 gold bar.

The collection event information user interface provides the user with the information they need in order to decide whether to play levels in the collection event, that is play levels in order to collect nuggets. For example, the user may see that they are close to collecting enough nuggets to acquire a gold bar, and therefore continue playing in the event. If the user decides to play levels in the event, the user selects the event activation element 208. Once selected, the user plays levels within the collection event, such that nuggets can be awarded for each level played, provided the collection conditions are met. The player continues to play within the collection event until either the user exits the event, or the event time expires. In some embodiments, the user can enter and exit the event without losing their progression, i.e. nuggets. For example, the user may decide to play some levels in the event in order to collect nuggets, and subsequently some other levels outside of the event during which time the user cannot collect nuggets. The user can then return to the collection event, provided it had not expired, and continue to collect nuggets and entering with the number of nuggets collected when last playing in the collection event.

Figure 3:
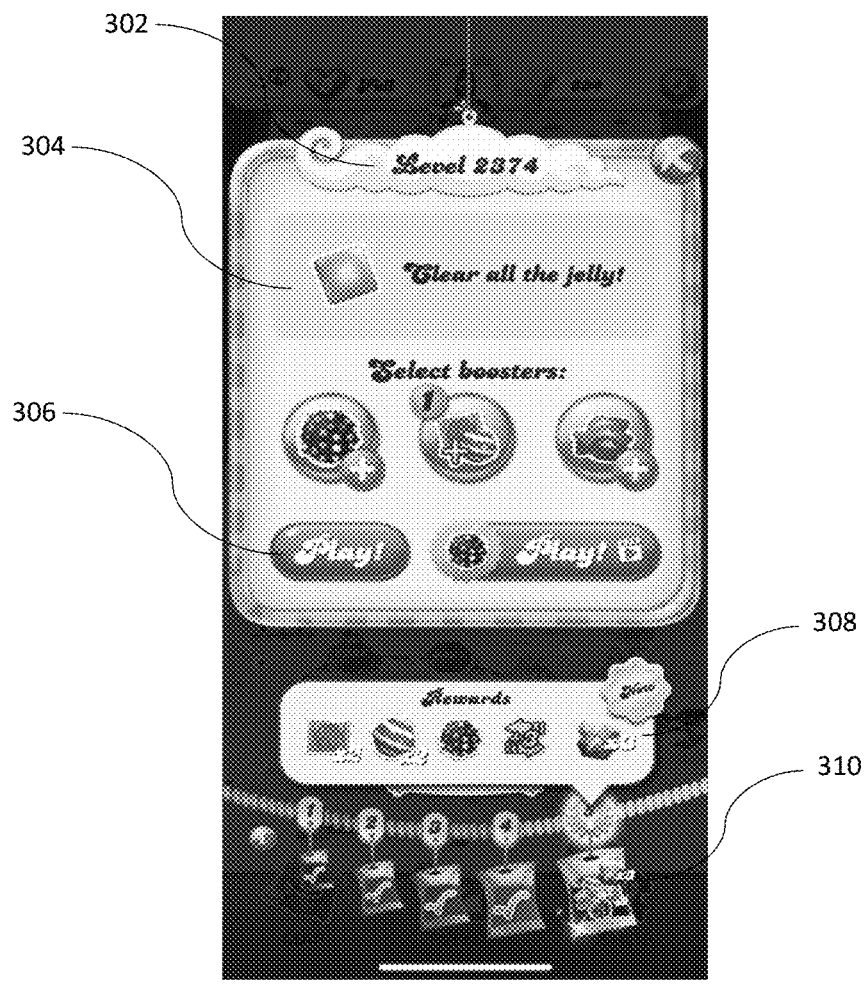
FIG. 3 is an example pre-level user interface.

Once the user has entered the event, that is, the user has selected the event activation element 208, a pre-level user interface is rendered to the user, an example of which is shown in FIG. 3. The pre-level user interface corresponds to a level the user has selected to play. This may be the next available level which the user has not yet attempted, or may be a level the user has previously completed and has selected to replay. The player may select levels from a level selection user interface, which provides a set of levels of the game of which the user is eligible to play at least one. The user may progress through a series of levels in a saga format, such that he must complete a level before being able to play the next level in the saga. The player is therefore eligible to play any level which they have previously completed, as well as the level next in the sequence after the highest level previously completed by the user. Levels may vary in difficulty, with lower levels being easier for a player to complete than higher levels. Therefore, as the player progresses through the levels, the level difficulty increases with the player's experience. Levels which a player is eligible to play are referred to as being "unlocked".

The pre-level user interface comprises a level indicator 302, indicating the level of the game the user has selected to play, a task indicator 304, providing the user with the requirements for completing the level, a level initiation element 306, a nugget indicator 308, indicating to the user the number of nuggets they will receive if they play the level, and a tier indicator 310, indicating the tier the player is determined to be in. Tiers are discussed in more detail below. In summary, a user with a longer winning streak is in a higher tier, and a larger number of nuggets is awarded to players in higher tiers.

The nugget indicator 308 is shown alongside indicators relating to other rewards associated with the tier of the user. When the user starts the level, the rewards shown are provided to the user. For example, the rewards include two boosters in the form of "striped candies", a special game element which, when combined with other blocks of the same colour, remove all blocks in the row/column of the striped candy, depending on the direction of the stripes. These are provided on the gameboard when the user starts the level.

When the user selects the level activation element 306, the game level begins and the gameboard is rendered to the user on a graphical user interface of a user device on which the player is playing by a processor of the user device.

Figure 4:
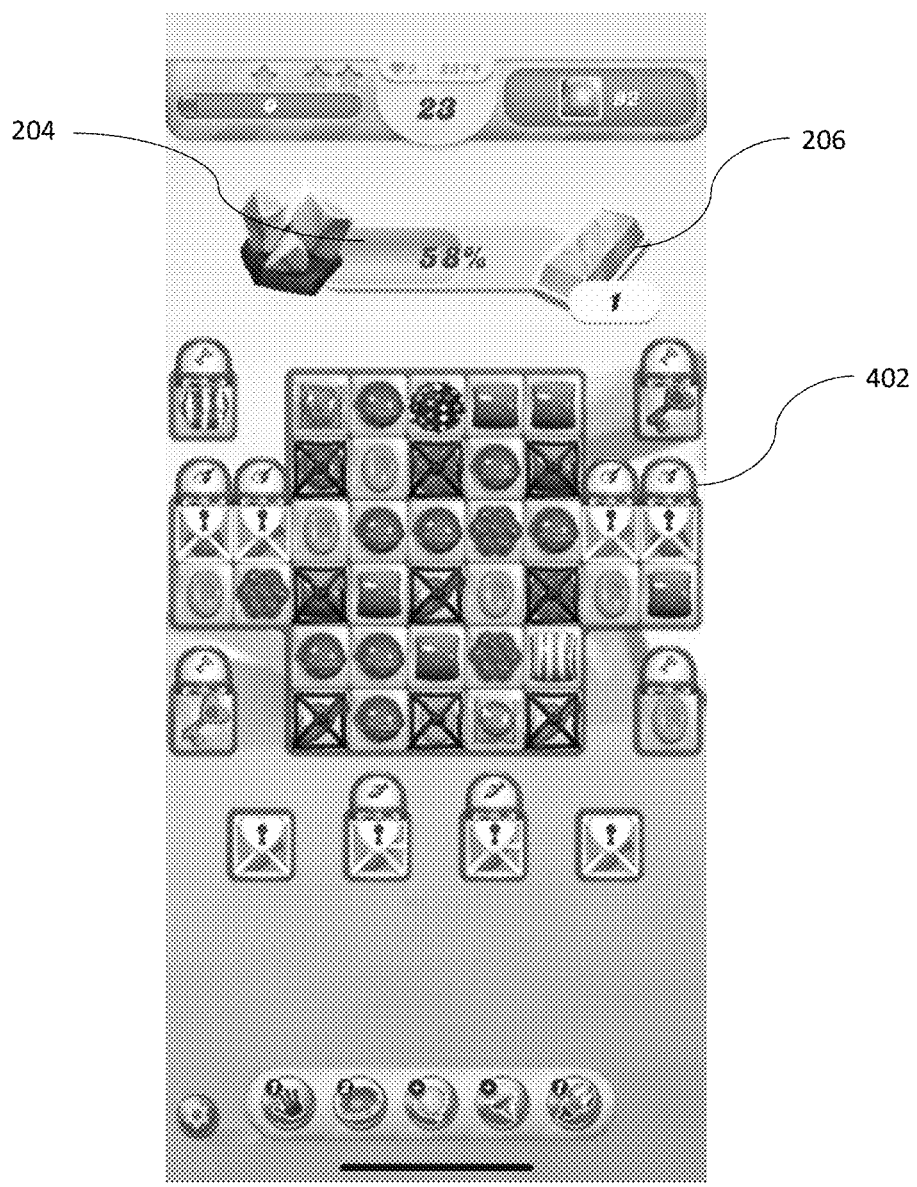
FIG. 4 is an example collection event gameplay user interface.

FIG. 4 shows an example game play user interface provided to the user when playing in the collection event. The game play user interface comprises a gameboard 402 populated with blocks, including those indicated as rewards on the pre-level user interface. The game play user interface also comprises the progression indicator 204 and the reward indicator 206. Here, the progression indicator 204 comprises the progression bar, graphically representing the player's progression towards collecting sufficient nuggets, and the progression score as a percentage.

The nuggets indicated in the pre-level user interface are provided to the user at the beginning of the level, such that the progression indicator 204 is updated before the user starts to play the level.

During the collection event, a fragment count of the user is maintained in a memory. FIG. 5 shows an example fragment database. The fragment databased comprises a player ID field and a fragment count field. Each player of the game is assigned a unique player ID when they create an account with the game, which is used to maintain player specific data associated with each player, as discussed below. The fragment database stores the fragment count of each player participating in the collection event with the player ID of said player. The fragment database is maintained in a computer store, for example at the remote server.

The fragment count stored in the fragment database corresponds to the total number of nuggets the player currently holds. When the player receives additional nuggets, the fragment count stored in association with the player's player ID is incremented by an amount equal to the number of nuggets received.

When the fragment count stored in association with a player ID is equal to or greater than the number of fragments needed to exchange for a utility object, herein referred to as a threshold fragment count, the fragment count is decreased by the threshold amount and the player is assigned a utility object. In such an event, the fragment count of the player may return to zero if the player had a fragment count equal to the threshold fragment count, or may be a positive integer if the player had a fragment count greater than the threshold fragment count.

In some embodiments, the fragment database may store a progression value instead of or as well as the fragment count, where the progression value indicates the user's progression towards obtaining a gold bar. For example, the progression value may be a percentage.

The number of nuggets awarded to the player is dependent on the player satisfying a collection condition. The collection event defines a number of collection conditions. The collection conditions define at least one condition which must be satisfied in order to receive nuggets, and the number of nuggets to be received on satisfying the condition.

When the collection event ends, the fragment count of each player is reset to zero.

FIG. 6 shows an example set of collection conditions. In the example of FIG. 6, each collection condition defines two conditions that the player must satisfy in order to receive nuggets, the number of nuggets (or fragments) the user will be assigned, and the threshold fragment amount required to exchange for a utility object. The set of collection conditions are defined for the collection event.

In the example of FIG. 6, the first condition relates to the level being played by the user. By defining at least one of the fragment amount and the threshold fragment amount based on the level the user is playing, gold bars can be awarded based on player skill and effort.

For example, a player playing any of levels 1 to 1000 needs to collect 20 nuggets in order to exchange them for a gold bar. However, a player playing the harder levels of 1001 to 2000 only needs to collect 15 nuggets to exchange for a gold bar. Thus, a player playing the harder levels receives a higher reward for completing the same number of levels.

The second condition in the example of FIG. 6 relates to a player's winning streak. Here, winning streak refers to the number of levels the player successfully completes consecutively. In other embodiments, two or more players may be able to play against each other in a race to complete a level. In such an embodiment, the winning streak refers to the number of levels a player has come first in when competing against at least one other player. A player may win a level by achieving the level objective within a shorter period of time or by accumulating more point in the level than their competitors.

The number of nuggets awarded to the user varies depending on the winning streak. The longer the user's winning streak, the more nuggets the user is awarded. In the example of FIG. 6, winning streaks are grouped, with a streak value falling within a group resulting in the player being awarded the same amount of nuggets. Three groups are defined: winning streaks of 1 to 5, winning streaks of 6 to 10, and winning streaks of above 10. It will be appreciated that any number of groups may be defined for any ranges of streak values.

The groups defining winning streaks correspond may also be referred to as tiers, as referenced earlier with respect to FIG. 3. In FIG. 3, five tiers are provided, corresponding to five different winning streak groups. Each tier defines a set of winning streaks, with a player being in a particular tier if their winning streak falls within the set of said tier. The tier also defines the rewards to be provided to a user for a given level. The rewards are indicated to the user on the pre-level user interface, i.e. the nuggets to be awarded to the user and any other rewards such as boosters which are to be provided on the gameboard. These other rewards may also be defined in the collection conditions.

In the example of FIG. 6, the number of nuggets awarded to a player depends on both the level and the winning streak. For levels 1-1000, the player is awarded 1 nugget if their winning streak is 1 to 5, 2 nuggets if between 6 and 10, and 3 nuggets if greater than 10. If, instead, the player is playing levels 1001-2000, the player is awarded 2, 3, or 4 nuggets for each of the winning streak groups respectively. If a player loses a level, their winning streak resets to zero. In such an event, the player keeps the nuggets they have earned, provided the collection event is still active.

By defining the number of nuggets awarded based on winning streaks, the players are more highly rewarded for achievements and therefore incentivised to play.

The winning streak of the player may be a winning streak of levels played by the user within the collection event. Alternatively, the player's winning streak may include levels played by the player outside of the collection event.

It will be appreciated that the collection conditions may comprise other conditions and/or parameters. For example, another condition may be a required number of points earned by the player in the previously played level, where the user is awarded more nuggets for a higher number of points. A player is awarded points during gameplay based on game moves. For example, a player is awarded a predefined number of points for removing a set of 3 blocks from the gameboard, another predefined number of points for removing a set of 4 blocks from the gameboard, and so on, with the player being awarded a higher number of points for removing more blocks in a single game move. Points may be awarded for a player meeting other criteria, such as streaks of consecutive successful game moves, as will be appreciated by those skilled in the art.

Another parameter which may be defined is the number of gold bars awarded in exchange for the threshold number of nuggets. This parameter may be used instead of the varying threshold amount. For example, players playing in level 1-1000 may receive one gold bar in exchange for 20 nuggets, whereas players playing in levels 1001-2000 may receive two gold bars in exchange for 20 nuggets.

In some embodiments, the collection event is linked to specific levels of the game, such that the player is automatically entered into the collection event when playing those levels. In this embodiment, a condition may be that the player is playing one of the defined levels, and the number of nuggets awarded may depend on the difficulty of the level.

A player progress database, an example of which is shown in FIG. 7, may be used to maintain information regarding a user's progress. The player progress database comprises the player ID of the player, a current level the player has reached, the current winning streak of the player, and the number of gold bars the player has accumulated. The player progress database may be stored locally at a user device of the player or remotely at the game server. If stored remotely, the player progress database may store the above-mentioned data for multiple players.

The player progress database is maintained irrespective of whether the player is playing in the collection event as it pertains to the user's progress in the game, rather than specifically in the event.

In some embodiments, the player progress database may comprise a fragment count field for storing the fragment count of the user. In such an embodiment, the separate fragment database as shown in FIG. 5 may not be implemented.

When a user is playing within the collection event, each of the collection conditions (FIG. 6), player progress database (FIG. 7), and fragment database (FIG. 5) are accessed in order to determine whether to award nuggets to the player, how many nuggets to award, and subsequently whether the nuggets are to be exchanged for gold bars.

Figure 8:
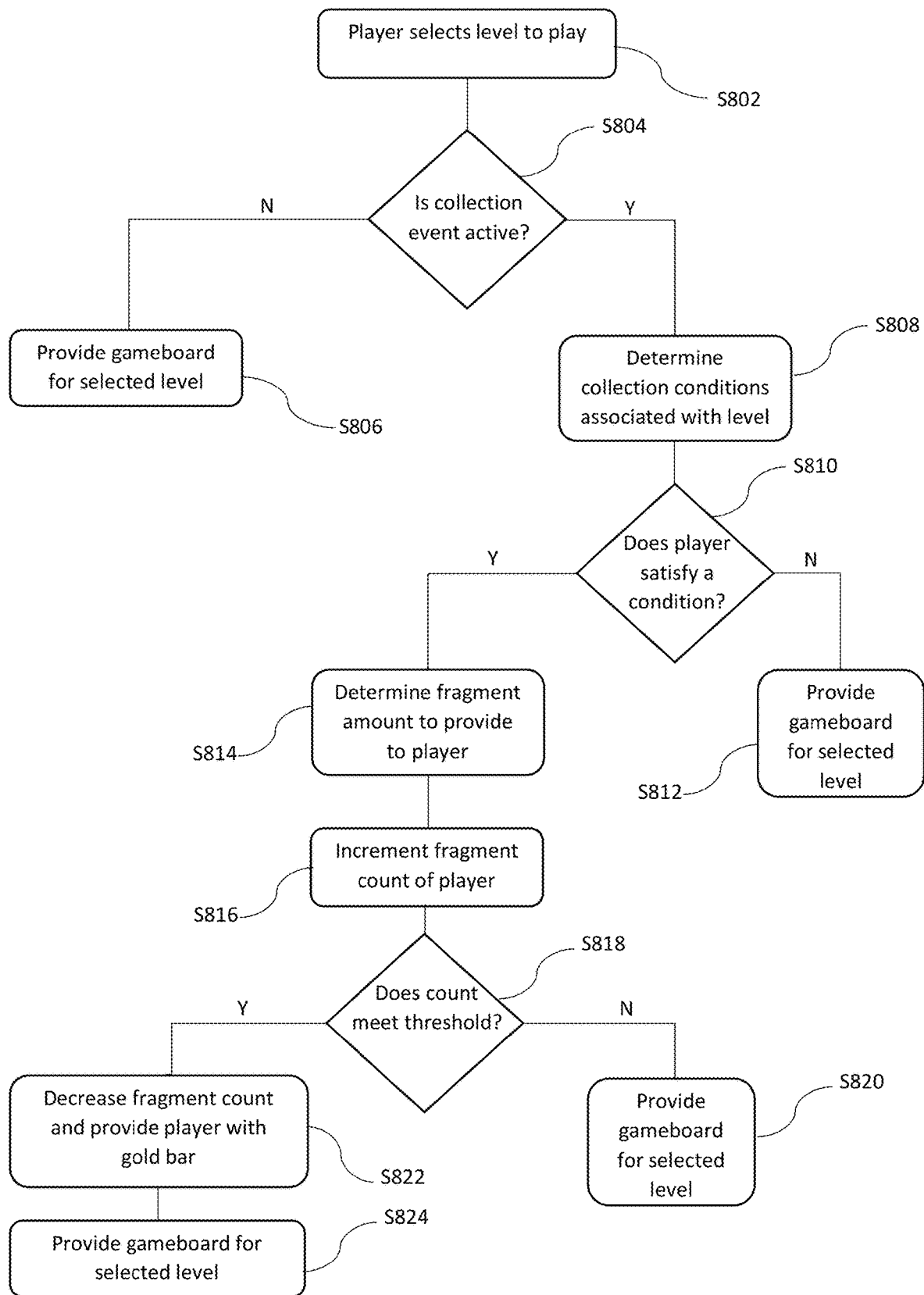
FIG. 8 shows an example method for assigning fragments and utility objects to a player.

FIG. 8 shows an example method for awarding nuggets and gold bars.

At step S802, the player selects a level to play. The user is provided with a set of levels of the game on a user interface, the player being eligible to play at least one of the levels. The player may be required to complete a level before being eligible to play (or unlocking) the next level, such that the player progresses sequentially through the set of levels of the game.

Once the player has selected the level they wish to play, it is determined at step S804 if the player is partaking in the collection event. If not, the gameboard for the user selected level is provided to the user, step S806. This gameboard is not provided together with the progression indicator 204 since the user is not participating in the collection event.

If, however, it is determined that the player is participating in the collection event, it is then determined at step S808 the relevant collection conditions, in this case those associated with the level. For example, if the player has selected level 1587, the collection conditions corresponding to levels 1001-2000 as shown in FIG. 6 are used.

Once the collection conditions against which the user's progress is to be assessed are determined, it is then determined if the player satisfies any of the collection conditions, step S810. Using the example collection conditions of FIG. 6, this step involves determining if the user has a winning streak and what that winning streak is. For this step, the user progress database (FIG. 7) is accessed, which stores an indication of the user's winning streak.

If the user does not have a winning streak, that is, the user does not satisfy any of the collection conditions, the gameboard is provided to the user at step S812. The user interface corresponds to that shown in FIG. 4, with the progression indicator 204 provided with the gameboard 402 such that the user can see the progress they have made towards collecting a gold bar.

If, however, the user does have a winning streak and therefore satisfies one of the collection conditions, the number of nuggets to award to the user is determined, step S814, based on the winning streak of the user. For example, if the user has a winning streak of 4, as shown in the user progress database of FIG. 7, the user is to be awarded 2 nuggets.

The fragment count associated with the user is then incremented, step S816, by the determined amount. For example, the fragment database of FIG. 5 is accessed, and the fragment count associated with the player with player ID 3597 is increased from 5 (current value) to 7 based on the satisfied collection condition. The new fragment count is stored in the fragment database. The fragment count is incremented by an algorithm executed on a processor which has access to the memory location of the fragment database.

It is then determined at step S818 if the fragment count of the user meets the threshold fragment count. The fragment count stored in association with the player's player ID is compared to the threshold amount defined in the collection condition satisfied by the player. In this example, the relevant collection condition defines that the threshold fragment count is 15, whereas the user only has a fragment count of 7. Therefore, the user has not acquired sufficient fragments to exchange for a gold bar. The gameplay user interface of FIG. 4 with a gameboard 402 corresponding to the user selected level is displayed to the user, step S820.

If, however, the user's fragment count does meet the threshold fragment count, the fragment count associated with the user stored in the fragment database is decreased by the threshold fragment amount and the player assigned a gold bar, step S822. The gold bar is assigned to the player by incrementing the gold bar value stored in the player progress database. This assignment is implemented by an algorithm executed on a processor which has access to the player progress database.

It will be appreciated that the method of FIG. 8 is provided as an example, and that variations of this method may be implemented. For example, the step of determining if the player satisfies a condition, step S810, may be followed by the step of providing the gameboard, steps S802 and S824, prior to determining the fragment amount, incrementing the fragment count, and determining if the count meets the threshold, steps S814-S820. In another embodiment, the fragment count is incremented prior to providing the gameboard, while the assignment of gold bars is implemented afterwards. Other modifications to the method of FIG. 8 will be apparent to the person skilled in the art.

It will be appreciated that the collection event set out above is provided by way of example only, and that other collection events may be implemented in a similar manner with varying characteristics.

For example, the collection event may be defined over any time period. The collection event may be a recurring event, with the event happening over the same defined time period every week or month, for example.

Alternatively, the collection event may be constant, but only active for a predefined set of levels. In such an embodiment, the user selects to partake in the collection event by selecting to play one of the levels of the predefined set.

In the example set out above, the user's fragment count is reset when the collection event ends. This reset may be implemented by way of a flag which indicates that the value is to be set to zero at the end of the event. In some embodiments, the user's fragment count at the end of the collection event is maintained, such that when the user first participates in a next collection event, the user has a fragment count equal to that when the previous collection event ended.

The user may only satisfy one collection condition each time the user plays a level, or per level selection by the user. That is, each time the user attempts a level, whether the user has attempted the level before or not, the user can satisfy at most one collection condition and thus only collect nuggets once per level attempt. In this way, the user is incentivised to continue playing more levels. In some embodiments, the user is limited to satisfying a collection condition only once per level. That is, the user can only collect fragments the first time they play a particular level, or the first time they successfully complete the level. This encourages the player to continue to progress through the sequence of levels.

Gold bars are presented above as the utility object for which fragments are collected. In Candy Crush Saga, gold bars are a soft currency, which may be exchanged within the game for features such as special game elements, referred to as boosters. Gold bars may additionally or alternatively be exchangeable for other game features which may help the user complete a level. For example, there may be a predefined number of game moves a user is allowed to make in order to complete the level, and the user may be able to exchange gold bars for additional game moves. Alternatively, the user may be given a predefined time in which to complete the game level, where the user can exchange gold bars for additional time. In some embodiments, the user is provided with a predefined number of lives for the game. The user loses a life if they fail to complete a level. Once all lives are lost, the user must wait a predefined period of time before their lives are replenished. The user may be able to exchange gold bars for additional lives. In some embodiments, the user may be able to exchange gold bars in order to maintain a winning streak. For example, if a player has a winning streak of 6, but loses the next level they play, the user may exchange a predefined number of gold bars in order to keep their winning streak at 6, rather than it being reset to zero on losing the level. The user may initiate the exchange by selecting an image of the gold bars rendered on the display.

The collection event described above may be used for other utility objects, such as boosters. Boosters are a type of special game elements which can be used by a user during gameplay to enhance game options for a user and/or allow the user to complete the level more efficiently. The striped candy described above is an example booster. Boosters are provided on the gameboard, and their special characteristics implemented if involved in a match-3 condition. In such an embodiment, the fragments collected by the players are fragments of the booster, or "booster dust", which is automatically exchanged for a booster once the threshold amount of booster dust has been acquired. These utility objects may be added to the gameboard once the user has collected sufficient booster dust, or the user may chose when to use the utility object may selecting a selectable rendered visualisation of the utility object.

It will be appreciated that fragments of any utility object, that is, an object which can be used by the user within the game environment, can be collected in the collection events set out above. For example, the utility object may be an additional life or a set of additional game moves.

In some embodiments, the user collects different types of fragments, the different types corresponding to different utility objects, during the collection event. For example, the user may be rewarded with both fragments associated with gold bars and fragments associated with a booster if the collection condition is satisfied. Different amounts of each may be assigned to the player and/or the number needed to exchange for the associated utility object may be different such that the player is rewarded each different utility object at different rates. In some embodiments, the player may be rewarded with different fragment types when playing different levels. The fragment database stores a count associated with each fragment type, and the collection condition defines a fragment amount and threshold amount for each fragment type.

More or fewer conditions may be defined in each collection condition. For example, each collection conditions may define only a single condition, such as a winning streak, for the user to satisfy in order to be awarded nuggets.

The user progress database of FIG. 7 may be stored locally on the user device and/or maintained centrally at the game server. The game server may store a user progress database comprising user progress data for all players of the game. If stored both locally and centrally, the local user progress database is updated as the user plays levels, with the central user progress database being updated in line with the locally stored data when the user is online and/or periodically. This allows the user to play offline without loosing any player progression. The fragment count of the user may also be stored locally for the same reasons.

As set out above, the game may be executed on a processor of the user device or a processor of the remote game server, or a combination of the two. The algorithms for incrementing the fragment count and assigning utility objects can be implemented at either of these locations, in keeping with which processor is implementing the game. The processor, whether local or remote, also implements an algorithm for determining if the fragment count is at least equal to the threshold count. It will be appreciated that the algorithms may be comprised in a single game, or collection event, code executed by the processor.

Figure 9:
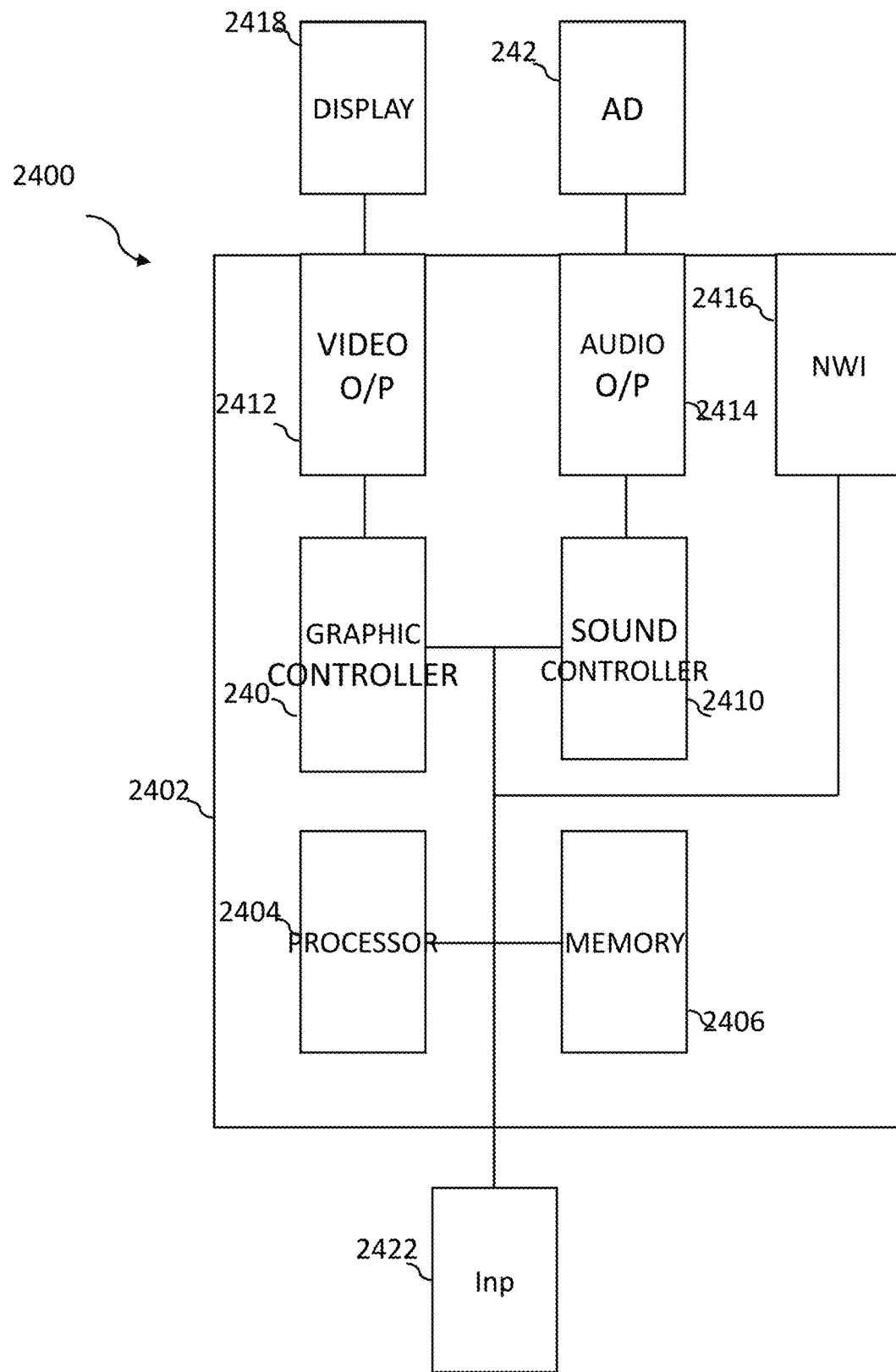
FIG. 9 is a schematic block diagram of the architecture of a computer device.

A schematic view of a user or computing device 2400 according to an embodiment is shown in FIG. 9. The user device has a controller 2402. The controller 2402 may have one or more processors 2404 and one or more memories 2406. For example, the data structures of FIGS. 5, 6, and/or 7 may be held in memory 2406. The controller 2402 is also shown as having a graphics controller 2408 and a sound controller 2410. It should be appreciated that one or other or both of the graphics controller 2408 and sound controller 2410 may be provided by the one or more processors 2404. Other functional blocks may also be implemented by suitable circuitry or computer code executed by the one or more processor 2404.

The graphics controller 2408 is configured to provide a video output 2412. The sound controller 2410 is configured to provide an audio output 2414. The controller 2402 has a network interface 2416 allowing the device to be able to communicate with a network such as the Internet or other communication infrastructure.

The video output 2412 may be provided to a display 2418. The audio output 2414 may be provided to an audio device 2420 such as a speaker and/or earphones(s).

The device 2400 may have an input device 2422. The input device 2422 can take any suitable format such as one or more of a keyboard, mouse, touch screen, joystick or game controller. It should be appreciated that the display 2418 may in some embodiments also provide the input device 2422, for example, by way of an integrated touch screen.

The blocks of the controller 2402 are configured to communicate with each other via an interconnect, such as a bus or any other suitable interconnect, and/or by point-to-point communication.

It should be appreciated that, in some embodiments, the controller 2402 may be implemented by one or more circuits, at least in part.

It should be appreciated that embodiments may be deployed in different system architectures. For example, the computer game may be implemented as a computer game that is stored in the memory 2406 of the user device 2400. However, when online, the server 205 may handle some elements of the game in some embodiments. By way of example only, a Java game applet may be provided to the user device 2400 and the locally running Java applet will generate, for example, the graphics, sounds, and user interaction for the game play on the user device 2400. Java applet can have sufficient information to allow offline play when the user device is no longer in communication with the game server 205, e.g. if connectivity is lost.

In some embodiments, the game may be implemented as a computer program that is stored in a memory system, for example the server 205, and which runs on the processor of the game server. Data streams or updates are supplied to the user device 2400 to allow the user device 2400 to render and display graphics and sounds in a browser of the user device 2400.

Figure 10:
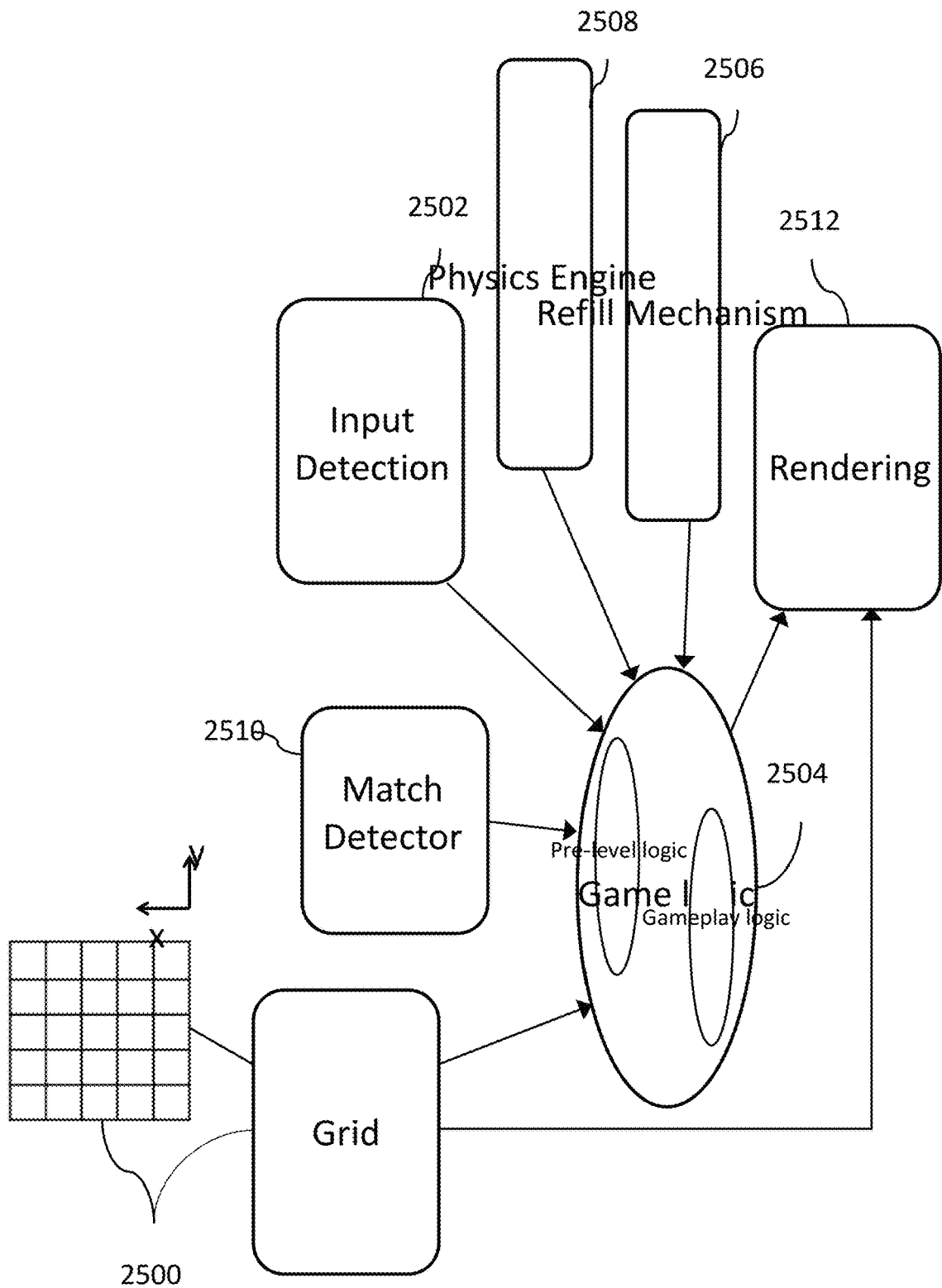
FIG. 10 shows a view of the functional components of the game.

FIG. 10 shows a schematic representation of the functional blocks of an embodiment of the present invention used to enable game play, such as that discussed above. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be removed if the match-3 condition is met. The game logic 2504 will process the information provided by the user input. The game logic 2504 may then determine if a valid selection has been made, and what the outcomes of the selection should be.

The user input can also be used in a pre-level game view to indicate that the user wishes to partake in the collection event, and which level the user wishes to play. Thus, the game logic comprises gameplay logic and pre-level logic. In this context, "pre-level" is not limited to the pre-level user interface of FIG. 3, but also encompasses any view provided to the user which is not a gameplay view. For example, a user interface provided to the user for selecting a level to play is considered here as a pre-level game view. The pre-level logic is therefore used to determine and maintain parameters of the game.

The rendering block is used to render the game board 402 to the user. It is also used to render the progression indicator 204 and reward indicator 206 in both the pre-level user interface and gameplay user interface, as well as the nugget indicator 308 and the tier indicator 310 of the pre-level user interface.

When the user satisfies a collection condition, the fragment count associated with the user is updated by the algorithm executed on the processor to represent the new number of nuggets the user has acquired. The pre-level logic determines if the collection condition has been met, the new fragment count of the user, and subsequently if the user is to be awarded any gold bars in exchange for nuggets. The pre-level logic therefore has access to, and has functionality to store data to, the fragment database and user progress database. The pre-level logic comprises the collection conditions defined for the collection event.

A grid component 2500 stored in a memory provides a grid representation of the game board as shown schematically in FIG. 10. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. the match detector component 2510, and the refill mechanism component 2506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function.

The game logic 2504 will determine the blocks selected by a user, and the actions to follow to implement the game mechanic.

Thus, the game logic controls the rules for determining if a valid group has been selected. The game logic will have access to data for each tile including its tile ID designating its location on the grid 2500, and associated tile data providing information about the contents of that tile, e.g. the game element within that tile or at least one characteristic associated with the game element within the tile. The game logic will thus be able to determine the game elements to be removed from those respective tiles for each user selection. The grid can be considered as a map which may be used to determining the relative positions of tiles on the game board from the tile ID. In embodiments of the present invention, the grid 2500 is implemented as a two-dimensional grid. By splitting the grid 2500 into row or column sets of tiles, each with their own deterministic game element generating algorithm, the game board may be simplified to a set of one-dimensional sub-grids. The grid 2500 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the endpoint of a game element moving due to a refill).

Once a group of blocks has been successfully selected, these blocks may be removed and the respective tiles will become empty. At this stage, a refill of the empty tiles is required based on the refill mechanism 2506. The refill mechanism may also have conditions on which it relies. For example, other moves or actions taking place on the game board may have to be completed before the refill mechanism can take place.

Each tile of the grid 2500 may be associated with data to indicate a status such as filled or unfilled (empty). Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of the physics engine 2508, or as the endpoint of a new block entering the game board. The physics engine component 2508 is configured to control the movement of moving game elements in the display. The physics engine 2508 may be part of the game logic 2504.

A filled tile will be treated by the game logic as a solid entity, preventing any other game objects from passing through this particular tile. By filled tile it is meant that the tile is occupied by a game element, e.g. a block, a booster etc. In this way, the game logic may also force the refill mechanism to conform to certain refill trajectories or paths. That is to say new or moving game elements will not be able to pass through or refill through filled tiles. It should be appreciated that the terms pass through and refill through are dependent on the specific game rules, e.g. some game boards may refill from a direction perpendicular to the plane of the game board.

Figure 11:
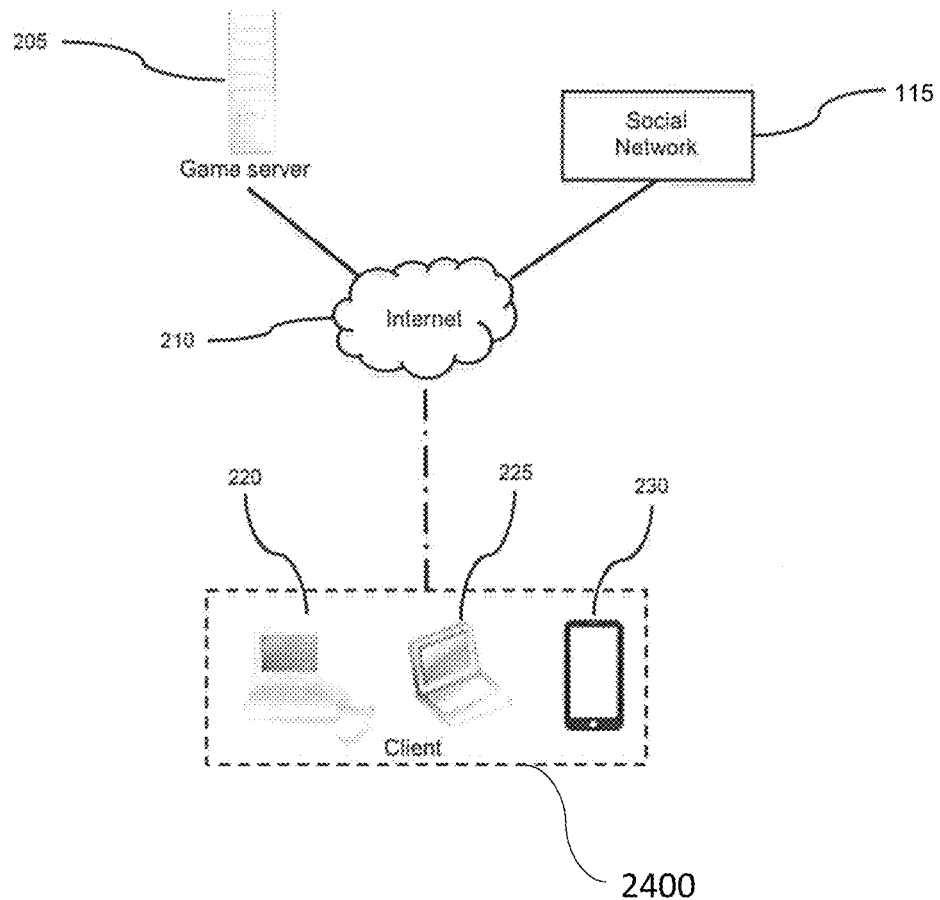
FIG. 11 shows a user device connected to a network.

FIG. 11 portrays an exemplary overall environment in which the present invention can be utilized. A virtual game is stored on for instance a game server 205. The virtual game is to be played on a client device 2400, such as a computer 220, 225 or a smartphone or other handheld device 230. The client device 240 can also be a kiosk, arcade gaming station, smart TV or other device with computing capabilities, input devices and a screen that can present the game to a user. The client device communicates with the game server 205 and a social network server 215, for instance through the Internet 210 or other network. It should be understood that the social network server 215 and the game server 205 do not have to be located in different places, they could be on the same server or on a plurality of servers located in different locations. People skilled in the art will understand that other devices than the exemplary ones listed can also be used without departing from the spirit and scope of the invention.

The invention claimed is:

1. A method of controlling a graphical user interface of a computer device, the method comprising:
    displaying on the graphical user interface a set of levels of a game, the game being executed by one or more processor;
    detecting a user selection of one of the set of levels at the graphical user interface;
    determining by the one or more processor that the user is partaking in a first level of a multiple level fragment collection event, the fragment collection event defining a set of collection conditions associated with a set of levels of varying difficulty to be consecutively completed by a user;
    determining by the one or more processor that one of the collection conditions is satisfied in the first level and assigning one or more fragments to the user, the fragments having no utility within a game environment comprising the game, wherein only one collection condition can be satisfied per level selection;
    storing in computer memory a fragment count associated with the user;
    where assigning the one or more fragments to the user comprises incrementing the fragment count associated with the user by a first predefined amount associated with the satisfied collection condition of the first level and storing a first incremented fragment count in the computer memory;
    determining by the one or more processor that the user is partaking in a second level of the fragment collection event,
    incrementing the fragment count associated with the user by a second predefined amount associated with a satisfied collection condition of the second level, and storing a second incremented fragment count in the computer memory,
    wherein the predefined amount is increased based on the number of levels consecutively completed by the user,
    wherein a total fragment count defines a total number of fragments collected by the user in the completed levels of the multiple level fragment collection event, wherein the multiple level fragment collection event is associated with a predefined time period;
    the method comprising rendering an inactivatable visual indication of the fragment count on the graphical user interface.

2. The method of claim 1, wherein the fragment collection event defines a number of levels for the user to win consecutively wherein the user wins a level if completed within an allotted number of game moves or predefined completion time.

3. The method of claim 2, wherein the predefined amount is based on the number of levels consecutively won by the user.

4. The method of claim 1, wherein the predefined amount is based on the difficulty of the user selected level.

5. The method of claim 1, wherein the method further comprises:
   detecting that the user has exited the fragment collection event; and
   resetting to zero the fragment count associated with the user.

6. The method according to claim 5, wherein the step of detecting that the user has exited the fragment collection event comprises determining if the predefined time period has expired.

7. The method of claim 1, comprising rendering on the graphical user interface a user selectable event element and detecting a user selection of the user selectable event element to initiate partaking in the fragment collection event.

8. The method of claim 1, wherein the fragment collection event is associated with a predefined subset of the set of levels, wherein the user partakes in the fragment collection event when the user selects one of the predefines subset.

9. The method of claim 1, wherein the method further comprises storing, in a fragment database accessible by the processor of the computer device, the fragment count associated with the user.

10. The method of claim 1, further comprising:
    displaying on the graphical user interface a gameboard associated with the user selected one of the set of levels, the gameboard comprising tiles supporting game objects, the game objects comprising user activatable game elements of differing characteristics;
    detecting a user input at the user interface when a user engages with the user activatable game element in a game move;
    detecting a match condition of a plurality of user activatable game elements having matching characteristics; and
    removing the plurality of the game elements of the match game condition and generating and displaying new game objects to replenish the gameboard for a next game move.

11. The method of claim 1, wherein the one or more processor is a one or more processor of the computer device.

12. The method of claim 1, wherein the one or more processor is a one or more processor of a server computer device remote from the computer device.

13. A computer device comprising:
    a graphical user interface;
    one or more processors configured to execute game code, which, when executed by the one or more processors, causes the one or more processors to:
      display on the graphical user interface a set of levels of a game;
      detect a user selection of one of the set of levels at the graphical user interface;
      determine that the user is partaking in a first level of a multiple level fragment collection event, the fragment collection event defining a set of collection conditions associated with a set of levels of varying difficulty to be consecutively completed by a user;
      determine that one of the collection conditions is satisfied in the first level and assigning one or more fragments to the user, the fragments having no utility within a game environment comprising the game, wherein only one collection condition can be satisfied per level selection;
      store in computer memory a fragment count associated with the user;
      where assigning the one or more fragments to the user comprises incrementing the fragment count associated with the user by a first predefined amount associated with the satisfied collection condition of the first level and storing a first incremented fragment count in the computer memory,
      determine by the one or more processor that the user is partaking in a second level of the fragment collection event,
      increment the fragment count associated with the user by a second predefined amount associated with a satisfied collection condition of the second level,
      store a second incremented fragment count in the computer memory,
      wherein the predefined amount is increased based on the number of levels consecutively completed by the user,
      wherein a total fragment count defines a total number of fragments collected by the user in the completed levels of the multiple level fragment collection event, wherein the multiple level fragment collection event is associated with a predefined time period;
    and render an inactivatable visual indication of the fragment count on the graphical user interface.

14. A non-transitory computer readable media on which is stored computer readable code which, when executed by one or more processor, causes the one or more processor to:
    display on a graphical user interface of a computer device a set of levels of a game;
    detect a user selection of one of the set of levels at the graphical user interface;
    determine that the user is partaking in a first level of a multiple level fragment collection event, the fragment collection event defining a set of collection conditions associated with a set of levels of increasing difficulty to be consecutively completed by a user;
    determine that one of the collection conditions is satisfied in the first level and assigning one or more fragments to the user, the fragments having no utility within a game environment comprising the game, wherein only one collection condition can be satisfied per level selection;
    store in computer memory a fragment count associated with the user;
    where assigning the one or more fragments to the user comprises incrementing the fragment count associated with the user by a first predefined amount associated with the satisfied collection condition of the first level and storing a first incremented fragment count in the computer memory,
    determine by the one or more processor that the user is partaking in a second level of the fragment collection event,
    increment the fragment count associated with the user by a second predefined amount associated with a satisfied collection condition of the second level, and
    store a second incremented fragment count in the computer memory,
    wherein the predefined amount is increased based on the number of levels consecutively completed by the user,
    wherein a total fragment count defines a total number of fragments collected by the user in the completed levels of the multiple level fragment collection event, wherein the multiple level fragment collection event is associated with a predefined time period;

and render an inactivatable visual indication of the fragment count on the graphical user interface.

* * * * *